United States Patent
Berard et al.

(10) Patent No.: US 10,616,212 B2
(45) Date of Patent: Apr. 7, 2020

(54) METHOD OF SENDING A DATA FROM A SECURE TOKEN TO A SERVER

(71) Applicant: GEMALTO SA, Meudon (FR)

(72) Inventors: Xavier Berard, Gemenos (FR); HongQian Karen Lu, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 261 days.

(21) Appl. No.: 15/516,136

(22) PCT Filed: Aug. 21, 2015

(86) PCT No.: PCT/EP2015/069218
§ 371 (c)(1),
(2) Date: Mar. 31, 2017

(87) PCT Pub. No.: WO2016/050414
PCT Pub. Date: Apr. 7, 2016

(65) Prior Publication Data
US 2017/0302650 A1    Oct. 19, 2017

(30) Foreign Application Priority Data
Oct. 2, 2014  (EP) .................................... 14306553

(51) Int. Cl.
*H04L 29/06*     (2006.01)
*H04W 12/00*     (2009.01)
(Continued)

(52) U.S. Cl.
CPC ............ *H04L 63/083* (2013.01); *G06F 21/35* (2013.01); *H04L 63/0876* (2013.01);
(Continued)

(58) Field of Classification Search
CPC ... H04L 63/083; H04L 63/168; H04L 63/876; H04W 12/0023; H04W 12/02;
(Continued)

(56) References Cited

U.S. PATENT DOCUMENTS

2009/0100264 A1* 4/2009 Futa ..................... H04L 9/0844
713/170
2011/0296182 A1* 12/2011 Jia .......................... G06Q 20/32
713/168

(Continued)

OTHER PUBLICATIONS

International Search Report (PCT/ISA/210) dated Oct. 23, 2015, by the European Patent Office as the International Searching Authority for International Application No. PCT/EP2015/069218.
(Continued)

*Primary Examiner* — Daniel B Potratz
*Assistant Examiner* — Vu V Tran
(74) *Attorney, Agent, or Firm* — Buchanan Ingersoll & Rooney PC

(57) ABSTRACT

The invention is a method for managing a response generated by an application embedded in a secure token in response to a command requesting opening a proactive session. An applicative server relies on an OTA server to securely send the command to the application. The method comprises the steps of: the application retrieves a data from the command and derives a key using a preset function, the application generates the response to the command, builds a secured response packet comprising the response secured with the derived key and sends the secured response packet to the applicative server.

12 Claims, 3 Drawing Sheets

(51) Int. Cl.
*H04W 4/60* (2018.01)
*H04W 12/04* (2009.01)
*H04W 12/02* (2009.01)
*G06F 21/35* (2013.01)
*H04W 12/06* (2009.01)
*H04W 4/14* (2009.01)

(52) U.S. Cl.
CPC .............. *H04L 63/168* (2013.01); *H04W 4/60* (2018.02); *H04W 12/0023* (2019.01); *H04W 12/02* (2013.01); *H04W 12/04* (2013.01); *H04W 12/06* (2013.01); *G06F 2221/2103* (2013.01); *G06F 2221/2107* (2013.01); *H04W 4/14* (2013.01)

(58) Field of Classification Search
CPC ......... H04W 12/06; H04W 4/60; H04W 4/14; G06F 21/35; G06F 2221/2103; G06F 2221/21
See application file for complete search history.

(56) References Cited

U.S. PATENT DOCUMENTS

| | | | |
|---|---|---|---|
| 2014/0052992 A1* | 2/2014 | Nozulak | H04L 63/0428 713/171 |
| 2014/0195797 A1* | 7/2014 | du Toit | H04L 63/168 713/152 |
| 2015/0319151 A1* | 11/2015 | Chastain | H04W 12/04 713/171 |

OTHER PUBLICATIONS

Written Opinion (PCT/ISA/237) dated Oct. 23, 2015, by the European Patent Office as the International Searching Authority for International Application No. PCT/EP2015/069218.
Giesecke & Devrient et al., "Change Request", 3GPP T3 SWG API Meeting #9, Oct. 29-31, 2011, 10 pages.

* cited by examiner

METHOD OF SENDING A DATA FROM A SECURE TOKEN TO A SERVER

FIELD OF THE INVENTION

The present invention relates to methods of sending data from a secure token to an applicative server. It relates particularly to methods of securely sending a response corresponding to a command initiated by an applicative server.

BACKGROUND OF THE INVENTION

A secure token is a tamper-resistant component able to store data and to provide services in a secure manner. In general, a secure token is a physical component which has a limited amount of memory, a processor with limited capabilities and is devoid of battery. For instance a UICC (Universal Integrated Circuit Card) is a secure token which embeds SIM/USIM applications for telecommunication purposes. A secure token can be installed, fixedly or not, in a terminal, like a mobile phone for example. In some cases, the terminals are constituted by machines that communicate with other machines for M2M (Machine to Machine) applications.

A secure token can be in the format of a smart card. A secure token may be a chip soldered to the mother-board of the host device and constitute an embedded-secure element (eSE).

A secure token can contain several emulated UICC.

A secure token can comprise an application intended to communicate with a distant applicative server. Most of the Telecom solutions rely on a communication protocol based on command/response between an applicative server and an application embedded in a secure token. This protocol is mapped into a secured Command Packet in a SM (short message) MT (mobile terminated) and a secured response packet in a SM MO (mobile originated) for the communication. Such a design can take benefit of the security layer of the communication channel of the Telecom operator for the applicative server to send a command and for the on-token application to send a response. The secure tokens concerned in this invention can utilize such a secure communication channel.

According to ETSI TS 143.019 V6.0.0, the responses are managed by a dedicated handler, called EnvelopeResponseHandler, in the UICC.

The ETSI TS 102 223 describes the principle of a proactive session which allows a UICC to send proactive commands to its hosting device. The proactive commands are managed in the UICC through a specific handler called ProactiveHandler.

Unfortunately, according to the § 6.6 of the ETSI TS 143.019 V6.0.0 the EnvelopeResponseHandler is no more available after the first invocation of the ProactiveHandler. Thus when the applicative server sends a command requesting the opening of a proactive session the token cannot send its response as usual.

There is a need for providing a solution allowing a secure token to send a response to the applicative server in a secure manner after an invocation of the ProactiveHandler.

SUMMARY OF THE INVENTION

An object of the invention is to solve the above mentioned technical problem.

The object of the present invention is a method for managing a response generated by an application which is embedded in a secure token acting as an UICC in response to a command requesting opening a proactive session. An applicative server relies on an OTA server to send the command to the application. The command is secured by the OTA server with a security layer independent of the content of the command. The method comprises the steps of:

identifying in the command a data for derivation of a key, receiving and deciphering the command in the secure token, the application retrieves the data from the command and computes the key by applying a preset function to said data, the application generates the response to the command, builds a secured response packet comprising the response secured with the key and sends the secured response packet to the applicative server, the applicative server computes the key by applying the preset function to the data and retrieves the response using the key.

Advantageously, the application may generate a key check value of the key and include the key check value in the secured response packet. The applicative server may retrieve the key check value from the secured response packet and verify the key check value to ensure the integrity and authenticity of the response.

Advantageously, the application may send the secured response packet directly to the applicative server.

Advantageously, the application may send the secured response packet to the applicative server via the OTA server.

Another object of the invention is a secure token acting as an UICC and including an application able to handle a command requesting opening a proactive session. The command is initiated by an applicative server and secured by an OTA server with a security layer independent of the content of the command. The application is able to generate a response corresponding to the command. The application is configured to retrieve a data from the command and to compute a key by applying a preset function to said data. The application is configured to build a secured response packet comprising the response secured with the key and to send the secured response packet to the applicative server.

Advantageously, the application may be configured to generate a key check value of the key and to include the key check value in the secured response packet.

Advantageously, the application may be configured to send the secured response packet directly to the applicative server.

Advantageously, the application may be configured to send the secured response packet to the applicative server via the OTA server.

Another object of the invention is a system including an applicative server and a secure token according to the invention, wherein the applicative server is configured to compute the key by applying the preset function to the data and to retrieve the response using the key.

Advantageously, the applicative server may be configured to compute the key by applying the preset function to the data, to retrieve the response and the key check value using the key and to verify said key check value.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure token configured to act as a UICC. For example the secure token may be a smart card, an UICC, an embedded-UICC (eUICC), an embedded-SIM or a software-implemented UICC.

The secure token may be coupled to any type of host machine having a baseband and able to establish a communication session with the secure token. For example the host machine may be a mobile phone, a tablet PC, a vehicle, a meter, a slot machine, a TV or a computer.

Figure 1:
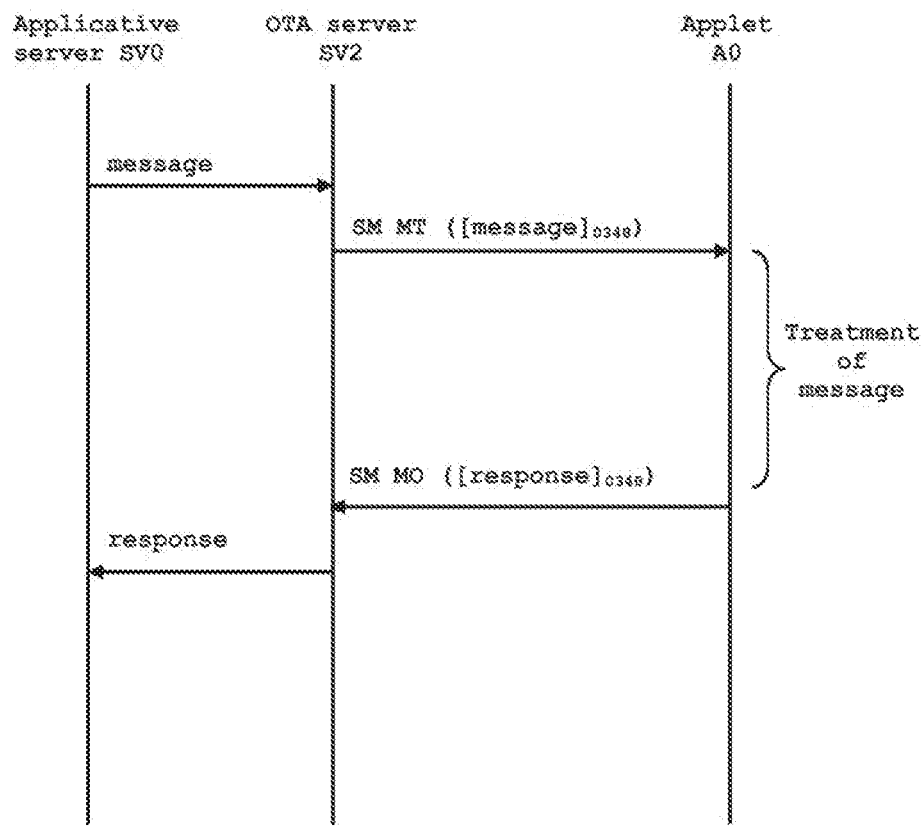
FIG. 1 depicts a first example of message exchange between an applicative server and an applet (that is, an application) embedded in a secure token according to the prior art.

By way of illustration, FIG. 1 shows a first example of message exchange between an applicative server SV0 and an applet A0 embedded in a secure token according to the prior art.

Over The Air mechanism (also known as OTA) is defined inter alia by the GSM 03.40, GSM 03.48 and ETSI/SCP-3GPP-3GPP2 standards. These documents specify specific protocols and a security layer known as "03.48 security layer".

The applicative server SV0 sends a command through a message to the OTA server SV2. Then the OTA server SV2 builds a SM MT containing the message. The OTA server SV2 secures the content of the SM MT by using the 03.48 security layer. Then the applet deciphers the received SM MT, executes the command, generates a response, and provides the response to the EnvelopeResponseHandler. Then the operating system of the secure token builds a SM MO, and sends it to the OTA server through the 03.48 security layer. Then the OTA server deciphers the SM MO, retrieves the response and sends the response to the applicative server SV0.

In the state of the art, the sending of the command and its corresponding response is secured by the same security layer.

Figure 2:
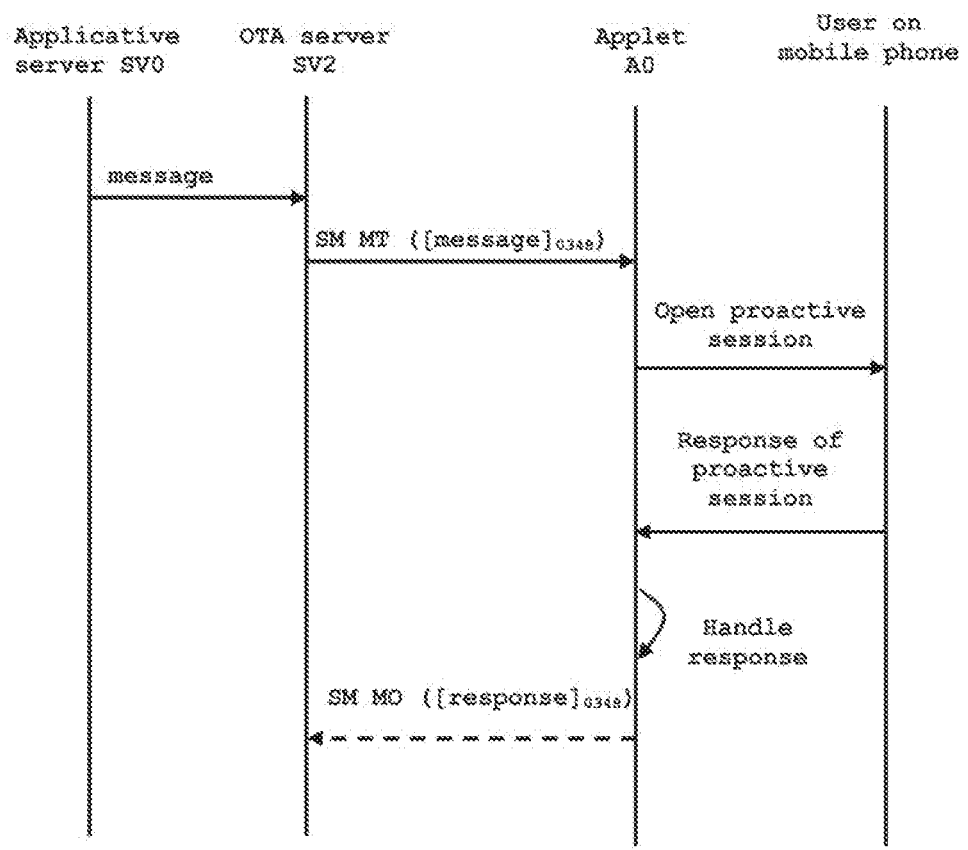
FIG. 2 depicts a second example of message exchange between an applicative server and an applet embedded in a secure token according to the prior art.

FIG. 2 shows a second example of message exchange between the applicative server SV0 and the applet A0 embedded in a secure token according to the prior art.

In this example, the command initiated by the applicative server SV0 requests the applet A0 to open a proactive session. The command is sent from the applicative server SV0 to the applet A0 in a way similar to the example of FIG. 1. For example, the proactive session may wait for a data selected by the user of the mobile phone hosting the secure token. When the applet A0 must send the response corresponding to the received command, the 03.48 security layer is no more available. The EnvelopeResponseHandler content must be posted before the first invocation of a ProactiveHandler.send method or before the termination of the processToolkit, so that the Applet can offer these data to the mobile equipment (e.g. 9Fxx/9Exx/91xx). After the first invocation of the ProactiveHandler.send method the EnvelopeResponseHandler is no more available. The SM MO containing the response cannot be transmitted in the same way it was sent in the example of FIG. 1. The dotted line shows that the message cannot be sent.

Figure 3:
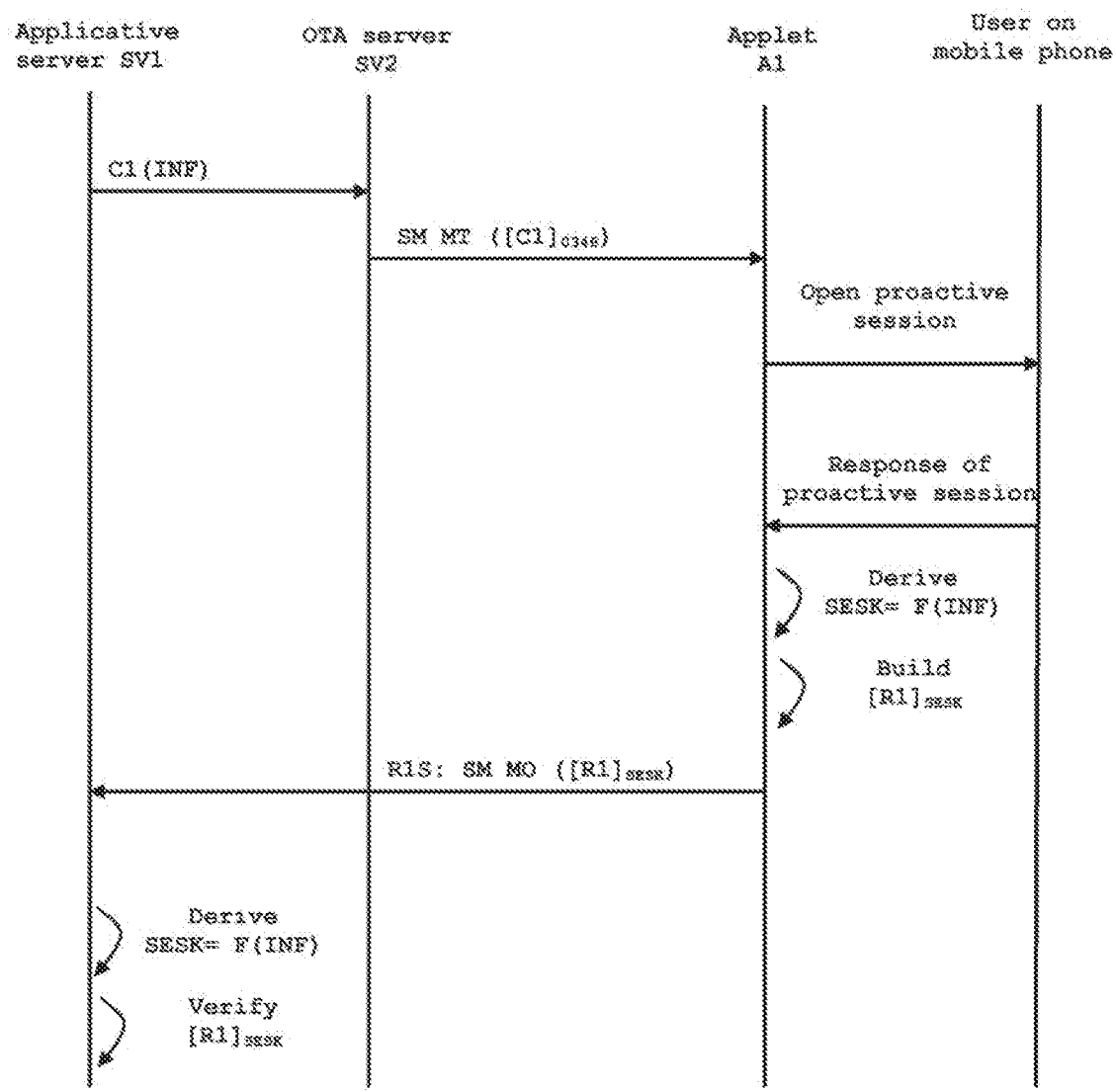
FIG. 3 depicts an example of message exchange between an applicative server and an applet embedded in a secure token according to the invention.

FIG. 3 shows an example of message exchange between an applicative server SV1 and an applet A1 embedded in a secure token according to the invention.

In this example, the command C1 initiated by the applicative server SV1 requests the applet A1 to open a proactive session. The command C1 is sent from the applicative server SV1 to the applet A1 in a way similar to the example of FIG. 1. The proactive session may display a data to the user through the screen of the mobile phone. For instance, the proactive Display Text command may be run.

For confidentiality reasons, the command C1 is sent from the OTA server to the secure token with a security level including at least ciphering of the applicative command C1. Thus no third party can intercept the message and have access to the data INF included in command C1.

Due to the proactive session, once the applet A1 has received the command C1, the secure session established between the OTA server SV2 and the secure token is closed.

The applet generates a response R1 corresponding to the execution of the command C1.

The applet A1 retrieves a particular data INF from the received command C1. For instance, the data INF may be defined as a combination of bytes extracted from the command C1 according to a preset rule. For instance, it may be the following rule: third byte concatenated to ninth byte then concatenated to second byte. In another example, the data INF may be defined as a timestamp or a message in the payload of the command C1. Thanks to these examples, the size of the message sent from the applicative server to the secure token is kept unchanged compared with the initial applicative command C1. There is no overhead.

In another embodiment, the data INF may be specifically added to an original command to form the command C1.

Then the application A1 run a preset function F using the data INF as input parameter for generating the key SESK. Preferably, the preset function F is a derivation function. For instance, the function F may be the HMAC-based Extract and Expand Key Derivation (HKDF according to RFC 5869) function. The function F may also be selected as any algorithm designed to derive a secret key from a seed. (being understood that the data INF is used as a seed)

Then the applet A1 generates a secured response packet R1S which comprises the response R1 secured with the key SESK. For instance the response R1 may be ciphered with the key SESK using the Triple-DES algorithm. Any algorithms able to guarantee integrity and confidentiality are relevant. For example an AES 128 (Advanced Encryption Standard 128 bits) algorithm would fit. Any symmetric algorithm with an appropriate key length would suit also. A preferred embodiment uses the same algorithm with the same key length as the one used within the SM MT.

An important point is that the used rules for retrieving the data INF, the derivation function F and the algorithm used for securing the response R1 are known from both the applicative server SV1 and the application A1.

As shown at FIG. 3, the secured response packet R1S can be sent directly from the secure token to the applicative server SV1. For instance, the secured response packet R1S can be handled through a simple SM MO targeting the applicative server SV1. In that case, the applicative server SV1 should be connected to a Short Message Service Center (SMSC) of the mobile operator network owning the OTA server SV2 in order to be directly reachable by the secure token.

Then the applicative server SV1 retrieves the data INF from the initial command C1 and computes the key SESK thanks to the function F. In other words, the applicative server SV1 recalculates the key SESK in the same manner as the application A1 did.

At this point, the applicative server is able to authenticate the received secured response packet R1S and to retrieve the response R1 by deciphering the secured response packet R1S.

Advantageously, the secure token may add a key check value (KCV) of the key SESK to the response R1 in order for the server SV1 to be sure it has applied the right process and that the received message has integrity and authenticity. In this case, instead of the response R1 alone, the concatenation of the response R1 and the KCV is secured by the key SESK. Thus, the applicative server SV1 can authenticate the received secured response packet R1S by checking the KCV and retrieve the response R1 by deciphering the secured response packet R1S.

The key check value may be computed according to the key type by using well known algorithms as explained in § B.5 of GlobalPlatform Card Specification Version 2.2.1 for example.

In another example, the secure token can send the secured response packet R1S to the applicative server SV1 via the OTA server SV2. For instance, the secure token can send to the server SV2 a SM MO containing the secured response packet R1S. This SM MO is not protected by a secure layer shared between the OTA server SV2 and the secure token. Then the OTA server SV2 forwards the secured response packet R1S to the applicative server SV1.

An advantage of the invention is to reuse the security layer of ETSI TS 102 225 for the sending of the applicative command to the secure token. It allows taking benefit of the secure messaging mechanism already designed for secure tokens acting as an UICC.

The invention avoids the deployment of an additional set of keys in a fleet of secure tokens. Such a key deployment is heavy because it requires high security for loading the additional keys and for secure storage in applicative server side.

It must be understood, within the scope of the invention, that the above-described embodiments are provided as non-limitative examples. In particular, the secure token may comprise any number of virtual UICC and the application is not necessarily an applet.

The invention claimed is:

1. A method for managing a response generated by an application embedded in a secure token acting as an UICC in response to a command requesting opening a proactive session, an applicative server relying on an OTA server to send the command to the application, said command being secured by the OTA server with a security layer independent of the content of the command,
wherein said method comprises the steps:
receiving and deciphering the command in the secure token;
the application retrieves the application data from the command and computes a key by applying a preset function to derive the key from said application data;
the application generates the response to the command by executing said command, builds a secured response packet comprising the response secured with the key and sends the secured response packet to the applicative server; and
the applicative server computes the key by applying the preset function to the application data and retrieves the response using the key.

2. The method according to claim 1, wherein the application generates a key check value of the key and includes the key check value in the secured response packet and wherein the applicative server retrieves the key check value from the secured response packet and verifies the key check value to ensure the integrity and authenticity of the response.

3. The method according to claim 1, wherein the application sends the secured response packet directly to the applicative server.

4. The method according to claim 1, wherein the application sends the secured response packet to the applicative server via the OTA server.

5. The method according to claim 1, wherein the application retrieves the application data from the command by combining bytes individually extracted from the command.

6. A secure token acting as an UICC, comprising:
a processor; and
a memory comprising an application that, when executed by the processor, cause the application to:
receive a command requesting opening a proactive session, said command being initiated by an applicative server and secured by an OTA server with a security layer independent of the content of the command,
retrieve application data from the command,
compute a key by applying a preset function to derive the key from said application data,
generate a response corresponding to the command by executing said command,
build a secured response packet comprising the response secured with the key, and
send the secured response packet to the applicative server to permit the application server to compute the key by applying the preset function to the application data and retrieve the response using the key.

7. The secure token according to claim 6, wherein the application is configured to generate a key check value of the key and to include the key check value in the secured response packet.

8. The secure token according to claim 6, wherein the application is configured to send the secured response packet directly to the applicative server.

9. The secure token according to claim 6, wherein the application is configured to send the secured response packet to the applicative server via the OTA server.

10. The secure token according to claim 6, wherein the application is configured to retrieve the application data from the command by combining bytes individually extracted from the command.

11. A system, comprising:
an applicative server, and
a secure token acting as an UICC, comprising:
a processor; and
a memory comprising an application that, when executed by the processor, cause the application to:
receive a command requesting opening a proactive session, said command being initiated by the applicative server and secured by an OTA server with a security layer independent of the content of the command,
retrieve application data from the command, compute a key by applying a preset function to derive the key from said application data, generate a response corresponding to the command by executing said command, build a secured response packet comprising the response secured with the key, and send the secured response packet to the applicative server; and wherein the applicative server is configured to compute the key by applying the preset function to the application data and to retrieve the response using the key.

12. The system of claim 11, wherein the application is configured to generate a key check value of the key and to include the key check value in the secured response packet, and wherein the applicative server is configured to compute the key by applying the preset function to the application data, to retrieve the response and the key check value using the key, and to verify said key check value.

* * * * *